United States Patent

Habosian

[15] 3,650,630
[45] Mar. 21, 1972

[54] FORCED ZERO SUBSYSTEM, PARTICULARLY FOR ELECTRO-OPTIC BACKGROUND CANCELLATION SYSTEMS

[72] Inventor: Kaspar Habosian, Watertown, Mass.
[73] Assignee: Baird-Atomic, Inc., Cambridge, Mass.
[22] Filed: June 12, 1970
[21] Appl. No.: 45,620

Related U.S. Application Data

[63] Continuation-in-part of Ser. No. 602,010, Dec. 15, 1966, abandoned, and a continuation-in-part of Ser. No. 859,249, Sept. 17, 1969, Pat. No. 3,588,252.

[52] U.S. Cl. ................................................356/82, 356/98
[51] Int. Cl. .........................................................G01j 3/30
[58] Field of Search ...............................356/81, 82, 85–87, 356/98

[56] References Cited

UNITED STATES PATENTS 2,577,814   12/1951   Saunderson et al. ......................356/81
3,531,202   9/1970    Wilkinson et al. ........................356/81

Primary Examiner—Ronald L. Wibert
Assistant Examiner—F. L. Evans
Attorney—Morse, Altman & Oates

[57] ABSTRACT

Line spectra and background energy superimposed thereon is alternately positioned "on" and "off" a slit. During the "off" period only background energy is positioned on the slit. Measuring and reference capacitors associated with photomultipliers, integrate the signal in such a manner that long time constant background energy is canceled. Short time constant background energy is canceled by detecting the polarity of the residual charge on the reference capacitor and by integrating, on each measuring capacitor, a signal representing the opposite polarity of the detected charge. In consequence, the residual charge on each of the measuring capacitors is driven to zero.

10 Claims, 6 Drawing Figures

INVENTOR.
KASPAR HABOSIAN
BY
Morse, Altman & Oates
ATTORNEYS

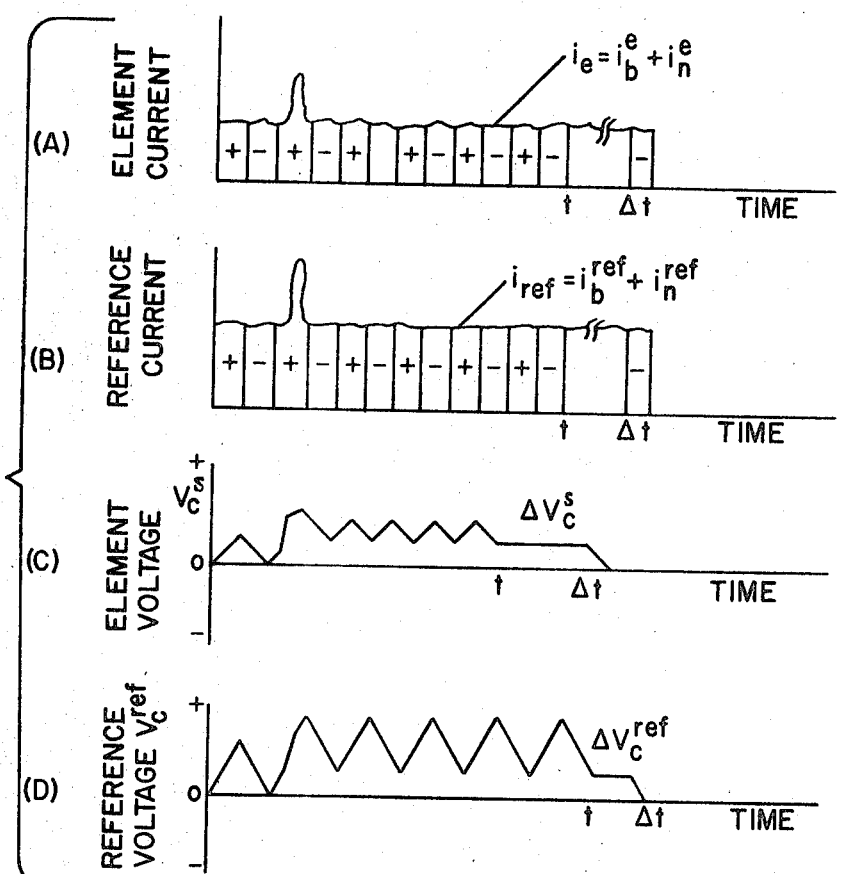
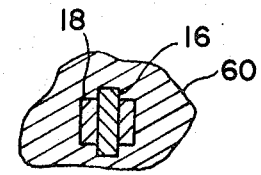
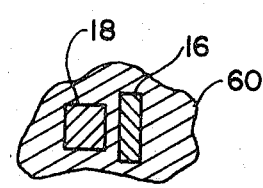
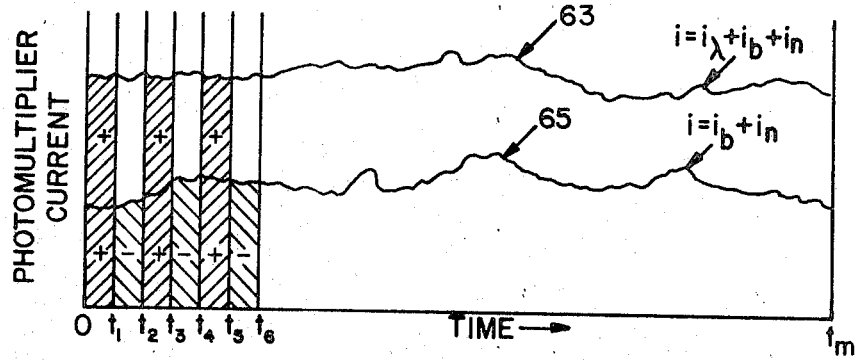

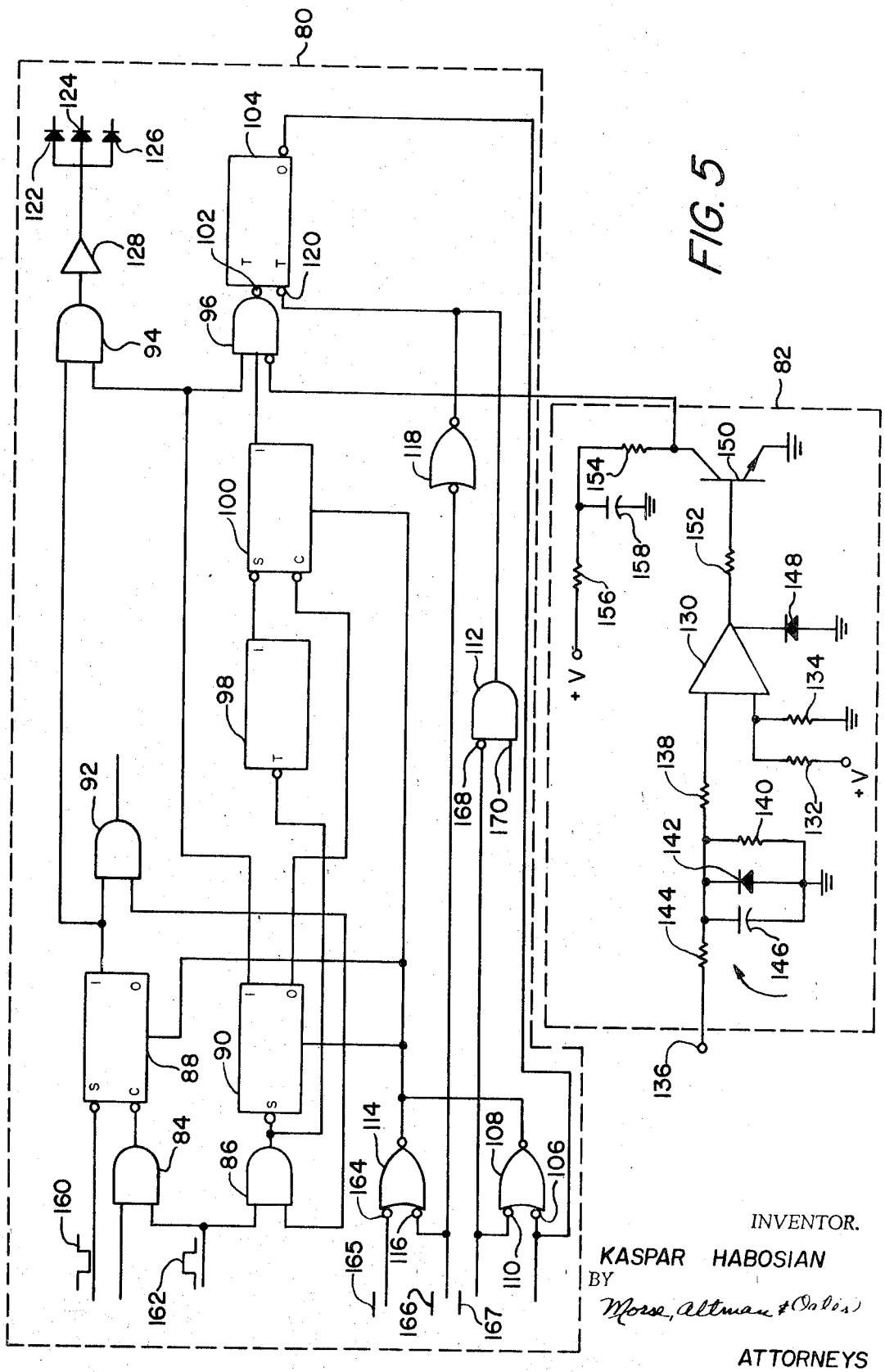

3,650,630

FORCED ZERO SUBSYSTEM, PARTICULARLY FOR ELECTRO-OPTIC BACKGROUND CANCELLATION SYSTEMS

CROSS-REFERENCES TO RELATED APPLICATIONS

This is a continuation-in-part of my U.S. application entitled Background Suppression System For Optical Spectrometer, Ser. No. 602,010, filed Dec. 15, 1966 (now abandoned) and my copending U.S. continuation application entitled Background Suppression System For Optical Spectrometer, Ser. No. 859,249, filed Sept. 17, 1969, now U.S. Pat. No. 3,588,252.

BACKGROUND OF THE INVENTION

1. Field of Invention

This invention relates generally to spectrometer instrumentation and, more particularly, is directed towards a novel method and associated apparatus for eliminating the effect of background energy from a monitored spectrum line in an automatic spectrometer.

2. Description of the Prior Art

Modern automatic spectrometers customarily employ photodetecting devices such as phototubes for measuring the intensity of selected line spectra. The line spectrum is produced by exciting a specimen and projecting the image through an entrance slit against a curved diffraction grating which disperses the radiant energy into its characteristic spectrum. Photomultipliers in register with exit slits convert the light spectrum emerging from the exit slits into electrical currents. The light spectrum, in addition to the spectral lines characteristics of the specimen also includes background energy due to the emission of a continuum from the source column and scattering within the optical system. This background energy, bandspectra superimposed on the line spectra, is the predominant contributor to the noise level in the system. The intensity variation of background energy from one operating cycle to another contributes to the noise level in the system and adversely affects the signal generated by the spectral line of interest. By eliminating the background noise, the fluctuation of the signal level, which is variation of line intensity, will be the main contributor to the noise level and the signal-to-noise ratio would be improved. This in turn would result in improved repeatability of the instrument. Heretofore, there has been no satisfactory technique for eliminating or controlling the background noise in a spectrometer.

SUMMARY OF THE INVENTION

An object of the present invention is to provide a method of improving the signal-to-noise ratio in an automatic spectrometer by cancellation of the effect of background noise comprising the steps of displacing the spectrum with respect to the exit slits so that the spectral lines oscillate across the slits while synchronously charging and discharging the integrating condensers to average out the background noise, detecting the polarity of the residual charge on a reference condenser, and integrating with an opposite polarity a plurality of measuring condensers in such a manner that the residual charge on the measuring condensers is driven to zero.

Another object of the present invention is to provide an improvement of the system described in the foregoing references which is characterized by a spectrometer having exit slits, a photomultiplier in register with the slits, means for shifting the spectrum and exit slit relative to one another, a program timer for controlling the shifting means, measuring condensers for integrating the output of the photomultipliers in register with the slits and a forced zero subsystem electrically interposed between the program timer and the integrating circuits for driving the residual charge on the integrating circuits to zero.

The invention accordingly comprises the electro-optic background cancellation system possessing the construction and combination of elements, and arrangements of parts that are exemplified in the following detailed disclosure, the scope of which will be indicated in the appended claims.

BRIEF DESCRIPTION OF THE DRAWINGS

For a fuller understanding of the nature and objects of the present invention reference should be had to the following detailed description of the preferred embodiment depicted in the accompanying drawing wherein:

FIG. 2a is a detailed view showing an exit slit in register with spectral background on a spectral line;

FIG. 2b is a detailed view showing a spectral line shifted out of register with an exit slit;

FIG. 3 is a graphical representation of the alternate integration of FIG. 1;

FIG. 4 is a graphical representative of the waveforms of FIG. 1; and

FIG. 5 is a logic diagram of the forced zero subsystem of FIG. 1.

DETAILED DESCRIPTION OF THE PREFERRED EMBODIMENT

Figure 1:
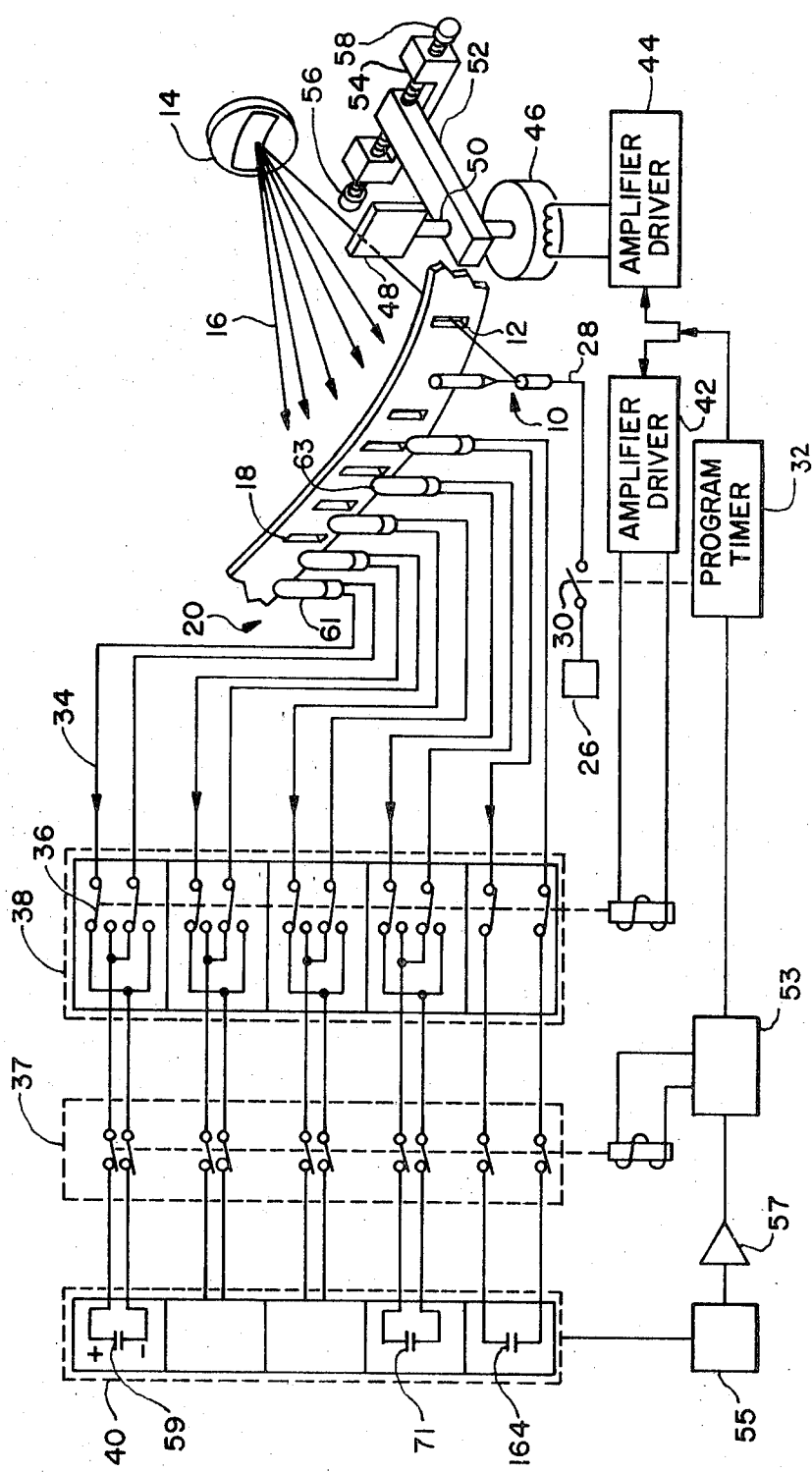
FIG. 1 is a perspective, somewhat schematic, of an electro-optic background cancellation system embodying the present invention.

Referring now to the drawings, the reference character 10 generally indicates an electrically excited gap in which a specimen is placed for excitation. The resulting radiation is passed through an entrance slit 12 against a curved diffraction grating 14 which disperses the radiation into a spectrum, rays of which are shown at 16. These spectral components pass through a plurality of exit slits 18 distributed in predetermined spaced relation in an arc oppositely the grating 14 for transmitting isolated wavelengths of the spectrum. A bank for photomultipliers 20 is provided to receive the spectral lines, each one of the photomultipliers is in register with a correlative slit to receive a selected spectrum line 16. In response to impingement by a spectral line each of the photomultipliers generates a signal the amplitude of which corresponds to the intensity of the monitored spectrum line.

The spark gap 10 is energized by means of a suitable power supply 26 through lead 28 interrupted by a switch 30. Switch 30 is operated by a program timer 32 which controls the sequence of operation of the system.

Photomultipliers 20 are connected by leads 34 through switches 36 of a bank of reversing relays 38 and switches 37 to measuring capacitors, integrating circuits and indicators generally indicated by reference character 40. The integrating circuitry includes a set of precision capacitors each of which is charged individually by a single photomultiplier to a voltage corresponding to the intensity of the spectrum line monitored by the correlative photomultiplier. The charges on the capacitors may be measured by known means to obtain quantitative and qualitative information on the specimen.

Switches 36 of relay bank 38 constitute reversing relays which are driven by program timer 32 through an amplifier driver 42. Program timer 32 also controls an amplifier driver 44 which operates a motor 46 coupled to an optically transparent plate 48 of calcium fluoride or quartz, for example. Plate 48 is rotatably supported by a shaft 50 carrying an arm 52. Program timer 32 also generates an end of excitation pulse for energizing a forced zero logic 53 which controls switches 37. Integrator circuits 40 are connected to forced zero logic 53 via a multiplexer 55 and an amplifier 57 having a high input impedance.

In a properly aligned spectrometer a spectral line 16 will register with an exit slit 18, the image of the line being superimposed on the slit as shown in FIG. 2a. In addition to the spectral line 16, a background band 60 which is wider than the spectral line 16 will be superimposed over the spectral line and thus will contribute to the radiant energy measured by the associated photomultiplier. Since the background band is extraneous noise, it interferes with the accurate measurement of the intensity of the spectral line. According to the invention, the noise effect contributed by the background may be eliminated by laterally shifting the spectrum so that the double image or the spectral line and superimposed background will be displaced from register with the exit slit and only the background portion of the image will be in register with the slit as shown in FIG. 2b. The spectrum is then shifted back to its original position with both superimposed images in register with the shift. When both the spectral line and background are in register with the slit the current generated by the photomultiplying device will depend upon three components, namely, the intensity of the specimen line spectra, the intensity of the background band spectra and the dark current in the photomultipying device. When the spectrum is shifted by angular movement of the plate 48, the spectral line will be laterally displaced and the specimen spectra line will no longer register with the exit slit. In this condition, the photomultiplier current is representative of the background band spectra intensity and the photomultiplier dark current.

In order to facilitate an understanding of the forced zero subsystem, the content of the photomultiplier current and the measuring technique now is described. If a capacitor 59 is used for integrating the output of a photomultiplier 61, the voltage on the capacitor is given by the expression $$V_c = \frac{1}{c} \int_0^t [i\lambda(t) + i_b(t) + i_n(t)] dt$$

where $i\lambda(t)$ is the current due to specimen line radiation,
$i_b(t)$ is the current due to background radiation,
$i_n(t)$ is photomultiplier 61 internal noise current,
$t$ is the exposure and integration time, and
$c$ is the capacitance of capacitor 59.

It is desirable that, at the end of integrating time, the charge accumulated on capacitor 59 is from the $i\lambda$ portion of the total photomultiplier tube current. Accordingly, the foregoing expression is integrated as follows:

$$V_c = \frac{1}{c} \int_{t_0}^{t_1} [i\lambda(t) + i_b(t) + i_n(t)] dt - \int_{t_1}^{t_2} [i_b(t) + i_n(t)] dt$$

During the period $t_0$ to $t_1$ the total photomultiplier tube current is integrated, while during the period $t_1$ to $t_2$ only the background radiation and the photomultiplier tube dark current are integrated. In the ideal case, i.e., with constant current and where ($t_0$ to $t_1$) and ($t_1$ to $t_2$) are equal, the capacitor voltage ($V_c$) at the end of the total integration time will be due to signal current ($i\lambda$) only. Since the photomultiplier tube current is continually varying, cancellation only can be achieved by a large number of short alternating periods during the total exposure time.

A graphical representation of the alternate integration is shown in FIG. 3 wherein curve 63 is the total photomultiplier tube current, including the signal and background-noise current, and curve 65 is the photomultiplier tube current less the signal current. During the odd periods, i.e., $t_0$ to $t_1$; $t_2$ to $t_3$ etc., the area under curve 63 is measured, and during the even periods, i.e., $t_1$ to $t_2$; $t_3$ to $t_4$; etc., the area under curve 65 is added in the opposite polarity. The final charge on the capacitor at time ($t_n$) represents the area between curves 63 and 65 during the odd periods, which corresponds to the signal current only. Since the cancellation is made in small increments compared with total exposure time, the cancellation of background and photomultiplier tube noise currents is independent of the shape of the curves. Accordingly, the cancellation method is independent of background variations from one analysis to another.

This form of current integration is accomplished by exposing the photomultiplier tube to both spectral line and background radiation during the odd periods, while at the same time reversing the polarity on the current entering the integrating capacitor.

During the odd periods reversing relays 38 and switches 37 are in deenergized position as shown in FIG. 1. As illustrated in FIG. 2a, the spectral lines and exit slits are coincident so that the light passing through exit slits 18 is the composite of both spectral line 16 and background radiation 60 and the measuring capacitors are charged with the polarity indicated.

During the even periods the reversing relays are in the energized position and switches 37 are in the deenergized position while the spectral lines are laterally displaced, as shown in FIG. 2b. This lateral shift is accomplished by solenoid rotation of transparent plate 48, which deflects the entire spectrum a distance determined by an arm 52 extending between adjusting screws 56 and 58 carried by the two legs of a yoke member 54. By selectively adjusting screws 56 and 58, the movement of arm 52 and plate 48 is preestablished to assure repetition of the spectrum position in both cases when the spectral lines are in and out of register with exit slits 18.

Now referring to FIG. 4, wherein the integrated currents of the specimen and a reference photomultiplier 63 are shown at $a$ and $b$, respectively. By way of example, the substantially smooth curves at $a$ and $b$ are interrupted by a single pulse. It is to be understood that the curves can be interrupted by more than one pulse, for example two or three pulses. When a pulse occurs in the background radiation, it will be readily appreciated that such a pulse will appear throughout the entire spectrum and the amplitude of the pulse will be approximately proportional to the average background intensity at each wavelength.

If the current were smooth without any disturbances, there would be no charge on the measuring capacitors at the end of integration time ($t$). However, because of the pulse there will be a voltage ($V_c^s$) on the measuring capacitors and a voltage $V_c^{Ref}$ on a reference capacitor 71. Since the pulses can occur during both the positive and negative integration periods, $V_c^s$ and $V_c^{Ref}$ can be either positive or negative. For convenience, $V_c^s$ and $V_c^{Ref}$ are shown in FIG. 4c and $d$ as being positive.

The function of the forced zero subsystem is to remove voltage $V_c^s$ from the capacitors in the manner hereinafter described. At the end of the integration time switches 37 are energized and all capacitors, including reference capacitor 71, are disconnected from their correlative photomultiplier, whereby current flow is stopped. The polarity of the reference channel $V_c^{Ref}$ is then electronically detected in a background zero detector 82. All capacitors are reconnected, i.e., switches 37 are deenergized, and the integrating mode of opposite polarity from $V_c^{Ref}$ is switched in for a period of time long enough to drive the $V_c^{Ref}$ and $V_c^s$ to zero. Thereafter, all capacitors are again disconnected and excitation source 10 is disabled. As a result, the $V_c$'s of all capacitors are simultaneously driven to zero. During the time $\Delta t$, the negative integrating mode is used because the pulse is positive. In the preferred embodiment, the negative integrating periods are shorter than the positive periods, for example 5 percent shorter, so that the $V_c$'s are always positive. This is done for simplicity of operation since there is no need for polarity detection and only the negative integrating mode is required to drive the $V_c$'s to zero.

A schematic diagram of the forced zero subsystem comprising a forced zero logic 80 and background zero detector 82 is given in FIG. 5. Forced zero logic 80 comprises AND gates 84 and 86 which are connected to flip-flops 88 and 90, respectively. The "ONE" terminal flip-flop 88 electrically communicates with AND gate 92 and 94, and the "ONE" terminal flip-flop 90 is connected to AND gates 94 and 96. The "SET" terminal of flip-flop 90 is connected to the "TRIGGER" input of a single shot multivibrator 98, the "ONE" terminal of single shot 98 electrically communicates with the "SET" terminal of flip-flop 100. The "ONE" terminal of flip-flop 100 inputs AND gate 96 which is connected to a "TRIGGER" input 102 of a single shot 104. The "ZERO" terminal of single shot 104 is connected to input 106 of OR gate 108. Input 110 of OR gate 108 is connected to the input of an AND gate 112 and the output of OR gate 108 is connected to the output of an OR gate 114. Input 116 of OR gate 114 electrically communicates with the input of an OR gate 118, the output of OR gate 118 being connected to the output of AND gate 112 and a "TRIGGER" input 120 of single shot 104. Diodes 122, 124 and 126 are electrically connected to the output of AND gate 94 via a relay driver 128.

Background zero detector 82 comprises a comparator 130 having voltage divider resistors 132 and 134 connected to its noninverting input. The inverting input of comparator 130 electrically communicate with an input terminal 136 via voltage divider resistors 138 and 140, a clamping diode 142, and a RC network including a resistor 144 and a capacitor 146. A clamping diode 148 is connected at the output of comparator 130 to limit the negative swing of the voltage as at the output thereof. A transistor 150 is resistively connected to the output of comparator 130 via a resistor 152. The emitter of transistor 150 is connected to ground and the collector is connected to a positive voltage via a resistor 154 and an RC network including resistor 156 and capacitor 158. The junction of resistor 154 and the collector of transistor 150 electrically communicates with an input of AND gate 96.

Forced zero logic 80 is energized by the leading edge of an end of excitation (EOX) pulse 160 which is applied to the "-SET" input of flip-flop 88. The signal as at the "ONE" side of flip-flop 88 drives AND gate 92 and the output of AND gate 92 energizes the spectral shift relay driver 44.

At the trailing edge of an EOX pulse 162, flip-flop 90 is set via AND gate 86 thereby providing for an and situation at the input of AND gate 94. The signal as at the output of relay driver 128 is applied to amplifier driver 42, multiplex driver (not shown) and a grounding relay at the input of amplifier 57 (not shown) via diodes 122, 124 and 126, respectively. The output of amplifier 57, which is monitoring the output of a background capacitor 164 via multiplexer 55 is fed to the input 136 of background zero detector 82. When the voltage as at terminal 136 increases to a preset level, signifying the end of the integration time, the signal as at the output of comparator 30 is such that transistor 150 conducts, in consequence the voltage as at trigger input 120 of single shot 104 decreases. The trailing edge of EOX pulse 162 also triggers single shot multivibrator 98, for example a 5MS delay single shot, whereby flip-flop 100 is set. The change of state of flip-flop 100 enables single shot 104 through AND gate 96, in consequence all capacitors are reverse integrated to zero. When the charge on reference capacitor 71 is driven to zero, background zero detector 82 triggers single shot 104 whereby the system is placed in a standby mode and the indicators are enabled.

A system clear signal 165 or a reset signal 166 as at a terminal 164 or terminal 116 1f OR gate 114, respectively, reset flip-flops 88, 90 and 100. An end of time pulse 167 as at terminal 110 of OR gate 108 and a λ cal signal as at inputs 168 and 170, respectively, of AND gate 112 are utilized to trigger single shot 104 during calibration of the system.

Since certain changes may be made in the foregoing disclosure without departing from the scope of the invention herein involved, it is intended that all matter contained in the above description and shown in the accompanying drawings be construed in an illustrative and not in a limiting sense.

What is claimed is:

1. The method of cancelling the effect of band spectra in a spectrometer having at least first and second exit slits, a photomultiplier mounted in registration with said first exit slit, a measuring capacitor operatively connected to said photomultiplier for storing the output of said photomultiplier, a reference photomultiplier mounted in registration with said second exit slit, and a reference capacitor operatively connected to said reference photomultiplier for storing the output of said reference photomultiplier, comprising the steps of:
   a. cyclically displacing a spectrum containing line spectra and band spectra form a first position where the band spectra and line spectra are in register with said first and second exit slits to a second position where only said band spectra is in register with said first and second exit slits,
   b. synchronously charging and discharging said capacitors to average out the effect of said band spectra,
   c. detecting the polarity of residual charge on said reference capacitor, and
   d. reverse integrating said reference and measuring capacitors for a period of time related to the residual charge on said reference capacitor to drive the charge on said measuring and reference capacitors to zero, whereby the effects of band spectra are cancelled.

2. An automatic spectrometer comprising:
   a. at least two exit slits, one of said exit slits being a reference exit slit;
   b. optical means for imaging a spectrum against said slits;
   c. said spectrum including at least one spectral line and a band spectra;
   d. a photomultiplier in register with each slit, said photomultiplier in register with said reference exit slit being a reference photomultiplier, said photomultiplier in registration with said other exit slit being a measuring photomultiplier;
   e. a measuring capacitor operatively connected to said measuring photomultiplier for storing a charge proportional to a signal generated by said measuring photomultiplier;
   f. a reference capacitor operatively connected to said reference photomultiplier for storing a charge proportional to a signal generated by said reference photomultiplier;
   g. shifting means for cyclically shifting said spectrum and exit slits relative to one another whereby said spectral line moves in and out of register with said other exit slit while said band spectra remains in register therewith;
   h. first switching means operatively connected to said measuring photomultiplier, said reference photomultiplier, said measuring capacitor and said reference capacitor for synchronously charging and discharging said measuring and reference capacitors to average out the effect of said band spectra;
   i. second switching means operatively connected between said first switching means and said measuring and reference capacitors for electrically connecting and disconnecting said measuring and reference capacitors from said first switching means; and
   j. forced zero background circuit including detector and logic means operatively connected to said measuring and reference capacitors for detecting the polarity of a residual charge on said reference capacitor and for reverse integrating said measuring and reference capacitors for a period specified by the residual charge stored on said reference capacitor to drive the residual charge on said measuring and reference capacitors to zero.

3. An automatic spectrometer, comprising:
   a. a plurality of exit slits distributed in predetermined spaced relation;
   b. a single source means for exciting a specimen to be analyzed, said excited specimen emiting characteristic radiation;
   c. optical means including grating means for dispersing said radiation into a spectrum and imaging said spectrum against said plurality of slits;
   d. said spectrum including a plurality of spectral lines and a band spectra;
   e. at least two photomultipliers each one being in register with one each of said slits, at least one of said photomultipliers being a reference photomultiplier and another of said photomultipliers being a measuring photomultiplier;
   f. at least two capacitors, each one of said capacitors being operatively connected to one each of said photomultipliers for storing a charge proportional to a signal generated by said respective photomultiplier, at least one of said capacitors being a measuring capacitor and another of said capacitors being a reference capacitor;
   g. an optically transparent plate mounted for angular movement in the optical path of said spectrometer between said source and grating means;
   h. servo means drivingly connected to said plate for oscillating said plate angularly with respect to said optical path for refracting said spectrum;

i. first switching means including a reversing relay operatively connecting said photomultipliers and capacitors for synchronously charging and discharging said capacitors;

j. program timer means electrically connected to said servo and switching means, for controlling said servo and switching means, whereby all of said spectral lines are moved in and out of register with said plurality of slits by said servo means while said band spectra remains in register therewith and the effects of said band spectra is averaged out by said first switching means;

k. second switching means operatively connecting said first switching means and capacitors for electrically connecting and disconnecting said first switching means and capacitors; and l. forced zero background cancellation circuit including detector and logic means operatively connected to said reference capacitor, measuring capacitor, and program timer means for detecting the polarity of a residual charge on said reference capacitor and for reverse integrating said measuring and reference capacitors for a period specified by the residual charge stored on said reference capacitor to drive the residual charge on said measuring and reference capacitors to zero.

4. The spectrometer as claimed in claim 3 wherein said forced zero background cancellation means comprises:
   a. a forced zero background detector electrically communicating with said reference capacitor; and
   b. a forced zero logic logically connected to said forced zero background detector for driving the charge on said capacitors to zero.

5. The spectrometer as claimed in claim 4 wherein said forced zero background detector comprises:
   a. filter means;
   b. a comparator having an input operatively connected to said filter means; and
   c. a transistor resistively connected to the output of said comparator, the conduction state of said transistor being governed by the signal as at the output of said comparator, the output of said comparator being related to the signal as at the output of said filter.

6. The forced zero background cancellation system as claimed in claim 5 wherein said forced zero background detector includes a diode clamp connected to the output of said comparator for controlling the polarity of the signal as at the output of said comparator.

7. The spectrometer as claimed in claim 4 wherein said forced zero logic comprises:
   a. a first flip-flop;
   b. a first AND gate electrically connected to said first flip-flop, said first AND gate providing an input signal to said servo means;
   c. a second flip-flop, said first and second flip-flops being controlled by the leading and trailing edge of an end of excitation pulse, respectively;
   d. a second AND gate electrically connected to said second flip-flop, said second AND gate providing an input signal to said second switching means;
   e. a first single shot multivibrator electrically connected to the output of said second AND gate;
   f. a third flip-flop electrically connected to said first single shot multivibrator, said third flip-flop being governed by said first single shot multivibrator; and
   g. a second single shot multivibrator logically connected to said second and third flip-flops, said second single shot being enabled by said second and third flip-flops when said measuring capacitors are reverse integrated, said spectrometer being in a standby mode when said second single shot is enabled.

8. In combination with an electro-optical background cancellation system having at least a reference capacitor and a measuring capacitor, a forced zero subsystem for driving the residual charge on said measuring capacitor to zero, said subsystem comprising:
   a. a forced zero background detector electrically communicating with said reference capacitor; and
   b. a forced zero logic logically connected to said forced zero background detector for driving a residual charge on said measuring and reference capacitors to zero.

9. The electro-optical background cancellation system as claimed in claim 8 wherein said forced zero background detector comprises:
   a. filter means;
   b. a comparator having an input operatively connected to said filter means;
   c. electronic clamping means connected at the output of said comparator for controlling the polarity of the signal as at the output of said comparator; and
   d. a transistor resistively connected to the output of said comparator, the conduction state of said transistor being governed by the signal as at the output of said comparator, the output of said comparator being related to the signal as at the input of said filter.

10. The electro-optical cancellation system as claimed in claim 8 wherein said forced zero logic comprises:
   a. a first flip-flop;
   b. a first AND gate electrically connected to said first flip-flop;
   c. a second flip-flop, said first and second flip-flops being controlled by the leading and trailing edge of an end of excitation pulse, respectively;
   d. a second AND gate electrically connected to said second flip-flop;
   e. a first single shot multivibrator electrically connected to the output of said second AND gate;
   f. a third flip-flop electrically connected to said first single shot multivibrator, said third flip-flop being governed by said first single shot multivibrator; and
   g. a second single shot multivibrator logically connected to said second and third flip-flops, said second single shot being enable by said second and third flip-flops when said measuring capacitors are reverse integrated, said electro-optical background cancellation system being in a standby mode when said second single shot is enabled.

* * * * *